United States Patent [19]

Mulholland et al.

[11] Patent Number: 5,142,597
[45] Date of Patent: Aug. 25, 1992

[54] INTERCONNECT ASSEMBLY FOR WALL OUTLET

[75] Inventors: Denis G. Mulholland, Lancaster; Ronald R. Schaffer; Gary N. Warner, both of Harrisburg, all of Pa.

[73] Assignee: AMP Incorporated, Harrisburg, Pa.

[21] Appl. No.: 866,283

[22] Filed: Apr. 10, 1992

Related U.S. Application Data

[63] Continuation of Ser. No. 558,933, Jul. 27, 1990, abandoned.

[51] Int. Cl.⁵ .............................................. G02B 6/38
[52] U.S. Cl. ........................................ 385/56; 385/55; 385/75
[58] Field of Search ..................... 350/96.2, 96.21; 385/55, 56, 75, 76

[56] References Cited

U.S. PATENT DOCUMENTS

| 4,611,887 | 9/1986 | Glover et al. | 350/96.2 |
| 4,762,388 | 8/1989 | Tanaka et al. | 350/96.21 X |
| 4,762,389 | 8/1989 | Kaihara | 350/96.21 |
| 4,872,736 | 10/1989 | Myers et al. | 350/96.20 |
| 4,960,317 | 10/1990 | Briggs et al. | 350/96.2 X |

FOREIGN PATENT DOCUMENTS

| 0330399 | 2/1989 | European Pat. Off. | 6/38 |
| 60-21893 | 9/1985 | Japan | 6/38 |
| 62-26141 | 2/1987 | Japan | 6/36 |

Primary Examiner—John D. Lee
Assistant Examiner—S. W. Barns

[57] ABSTRACT

An interconnect assembly 1 includes an adapter assembly 15, a coupling bushing 13 and an insert 14. The assembly 1 is situated within a wall outlet 2 having a hood assembly 4 with an aperature 8 for receiving therethrough a plug terminated optical fiber cable. The plug is received through the aperture 8 and interconnected by means of the interconnect assembly 1 with a second optical fiber cable. The assembly 1 comprises a receptacle housing 18 having at least one forward extending compartment structure 46, open at a front receiving face and a receptacle 17 within the housing 18 for receiving the first optical cable within the compartment structure 46 for connection to the plug terminating the first optical fiber cable. The assembly 1 further comprises an insert 13 with a guide port 56. The guide port 56 receives the forward extending compartment structure 46 of the receptacle housing 18 with the receptacle 17. The insert 13 further includes connecting means for securing the insert 13 to the hood assembly 4 of the wall outlet 2.

17 Claims, 3 Drawing Sheets

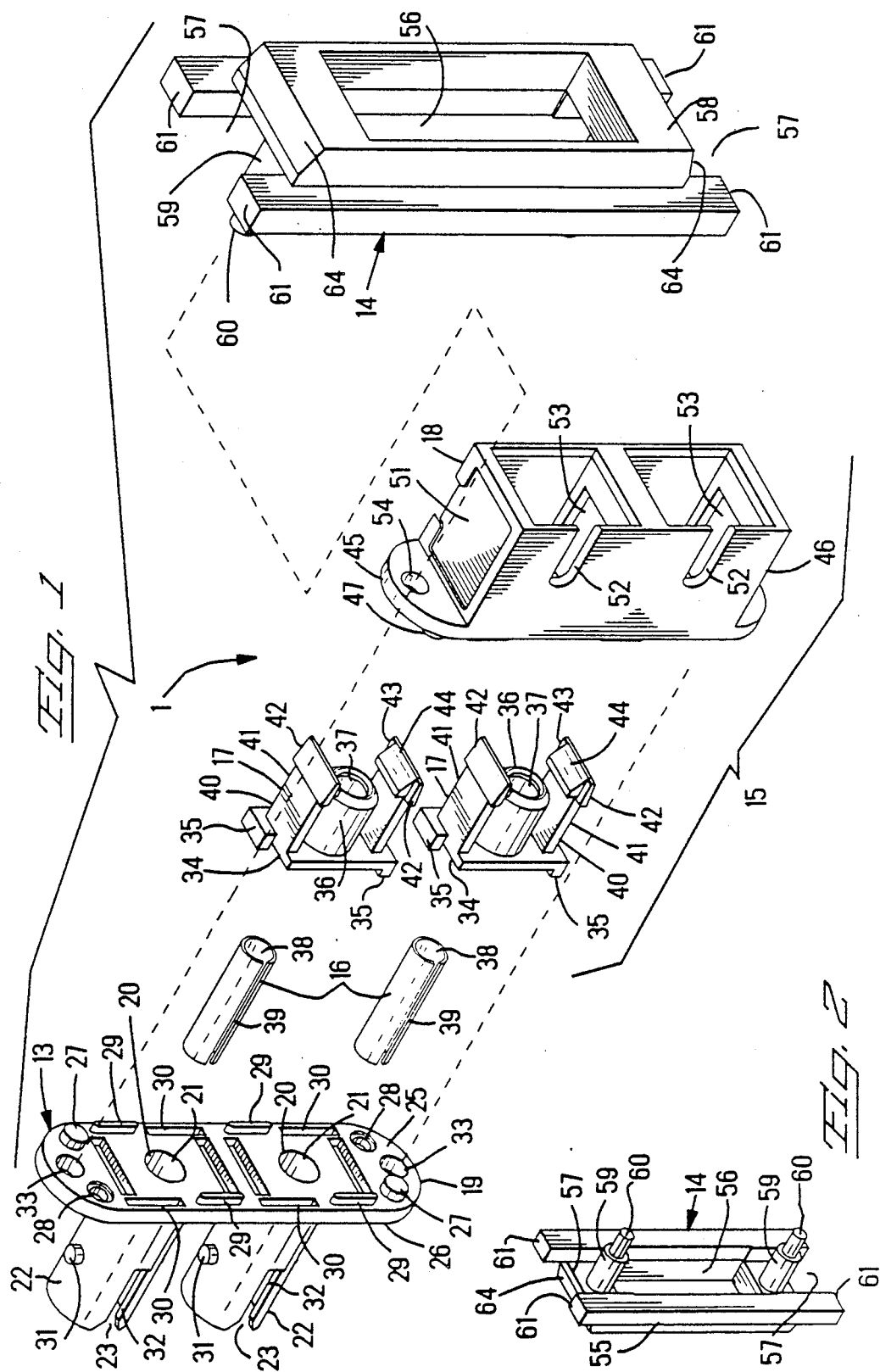

INTERCONNECT ASSEMBLY FOR WALL OUTLET

This application is a continuation of application Ser. No. 07/558,933 filed Jul. 27, 1990 (abandoned).

FIELD OF THE INVENTION

This invention relates to an interconnect assembly for a wall outlet for a fiber optic connector assembly. The insert converts the wall outlet from an outlet for interconnection with plug connectors, particularly of the fixed shroud duplex (FSD) type, to an outlet for intermating with connectors of the push-pull coupling type.

BACKGROUND OF THE INVENTION

Wall outlets for fiber optic connector assemblies are known. For example, Glover et al., U.S. Pat. No. 4,611,887, assigned to the present assignee and incorporated herein by reference, discloses and claims a fiber optic connector assembly and a wall outlet into which it connects. This interconnect system is designed to be easily assembled and for accurately aligning the terminated ends of fiber optic transmission members for optimum operation.

Further, Briggs et al., U.S. Pat. No. 4,960,317, filed Aug. 18, 1989, teaches another fiber optic wall outlet having an annular flange for mounting to a wall, and a hood mounted in the flange. The wall outlet further includes a spring member which urges the hood to snap outward, and fingers which engage against the annular flange and prevent the hood from snapping outward. An interconnect assembly, to which a first optical fiber cable is connected, is mounted in the wall outlet. When the hood snaps outward, access is provided to the interconnect assembly so that a plug connected to a second optical fiber cable, such as a FSD plug and cable, can be plugged into the interconnect assembly.

Other types of connectors beside the FSD type connectors are known. Particularly useful and advantageous are the push-on lock type, also known as push-pull coupling type, which are particularly useful because of their versatility and ease of use. For example, Umeki, et al, Japanese Showa 60-218932 discloses a push-pull coupling type. It includes an adapter equipped with an alignment sleeve and resilient catch pieces. The pieces are in cantilever form with protrusions and a claw attached to the tip of the form. The connector also includes a frame that contains an integrated ferrule and a through passageway from the rear to the front of the ferrule. The frame has protruding parts that are caught by claws of the resilient catch pieces of the adapter. A resilient inner tube shaped in the form of a round tube has an inside diameter almost equal to the outside diameter of the optical fiber cable and an outside diameter almost equal to the hole in the rear portion of the plug frame. A cord tube has a flexible part at its front end which, when inserted into the hole in the rear of the plug frame, is secured to the frame by the bending of the flexible part. The plug frame also has a finger grip mounted on its outside with raised parts. When the ferrule of the plug frame is inserted into or pulled from the alignment sleeve, the raised parts of the plug frame contact the protrusions of the cantilever form and push the resilient claws to the outside allowing the protrusions to pass. The plug frame may have a finger grip housing which is able to slide forward and backward with respect to the plug frame and, additionally, which has raised parts which release the catch of claws on the protruding parts of the plug frame when the finger grip housing is moved backward.

Iwasa, et al, Japanese Showa 62-26141, relates to a duplex type of connector in which a permanent housing provides two alignment sleeves and two ferrules to permanently encompass two optical fibers of the push-pull coupling type of connector. Similarly, Myers, et al, U.S. Pat. No. 4,872,736, relates to a duplex connector encompassed within a release cover to provide a plug of the push-pull coupling type.

Kaihara, et al, U.S. Pat. No. 4,762,389, discloses both a simplex pin-type of plug and a duplex pin plug that includes a cooperative pair of plug holders accommodated within a single housing. This second embodiment, comprising the plugs encompassed within a singular permanent housing, is advantageous in that it permits simultaneous connect and disconnect of the fiber plugs from the pair of other optical fibers or optical components such as a light emitting and light detecting element.

Gerace et al U.S. patent application Ser. No. 07/159,151, now abandoned published EPC Specification No. 0330399, Aug. 30, 1989, relates to a sheath connector for an optical fiber. This connector may be adapted to a push-pull type connector by a plug housing in two sections with biasing surface and slot for mating with resilient catch pieces of an adapter, as indicated by Mulholland et al, U.S. patent application Ser. No. 491,755.

Advantageous would be a means of converting a wall outlet, designed to accommodate the popularly used FSD connectors, to an assembly which would provide interconnect capabilities with the push-pull coupling type of connectors. The present invention relates to an insert and to an interconnect assembly for achieving just such object. The present invention particularly relates to an interconnect assembly for a push-pull type connector that incorporates the Gerace et al. sheath connector as disclosed by Mulholland et al.

SUMMARY OF THE INVENTION

The present invention relates to an interconnect assembly within a wall outlet having a hood assembly with an aperture for receiving therethrough a plug terminated optical fiber cable. The plug is received through the aperture and interconnected by means of the interconnect assembly with a second optical fiber cable. The assembly comprises a receptacle housing having at least one forward extending compartment structure open at a front receiving face and a receptacle within the housing for receiving the first optical cable within the compartment structure for connection to the plug terminating the first optical fiber cable. The assembly further comprises an insert with a guide port. The guide port receives the forward extending compartment structure of the receptacle housing with the receptacle. The insert further includes connecting means for securing the insert to the hood assembly of the wall outlet.

The interconnect assembly may have a wall outlet hood assembly further including securing means situated to the sides of the aperture. The securing means comprises latching beams each terminating in a paw with lip. The insert further comprises a platform with spacings at opposing ends defining clearance for snap-in press fit between the flanges so as to be captured by each paw and lip of each flange. The insert, further, may be characterized by a face forward extending with the guide port. The face has defined dimensions for close fit through the aperture of the outlet hood assembly to thereby position the receptacle housing and receptacle for receiving the plug of the first optical fiber cable. The forward extending face further has chamfered edges to provide equal stressing to the latching beams during snap-in press fit of the insert.

The receptacle, further, may comprise a base with a front socket extending therefrom and having longitudinal axis and axial bore. The base has at least two resilient catch pieces of cantilever form extending from the base parallel to and on opposing sides of the longitudinal axis of the front socket. The catch pieces terminate in protrusions and lip structures.

The interconnect assembly, further, may include an alignment sleeve encompassed by the front socket of the receptacle with the longitudinal axis of the alignment sleeve extending parallel with the longitudinal axis of the socket. The alignment sleeve may have annular beveled front edge.

Each catch piece comprises a tab body terminating in protrusion and lip structure. Each protrusion may be wider than each tab body of each catch piece.

The receptacle housing may comprise a base having the compartment structure extending forward therefrom. The base is characterized by at least one nub and one recess for fit to complementary nub and recess of an attaching element.

In on embodiment of the present invention, the first optical fiber cable and plug comprise a plug housing with spacing through its body at a surface of a forward section and with defined exterior profile at a rearward section. Further included is a connector assembly accommodated by and substantially within the plug housing, the connector assembly having disposed at one exterior surface thereof, ridge and slot and, in conjunction therewith, tab. The ridge, slot and tab are exposed through the spacing at the surface of the forward section of the plug housing. Further included is a ferrule for fixing the optical fiber on a center axis thereof. The ferrule is accommodated within the connector assembly. With this embodiment, the lip structure of each catch piece of the receptacle is, beveled inwardly to facilitate lead-in to the spacing of the plug housing as the optical fiber connector is loaded into the wall outlet and connected to the interconnect assembly.

BRIEF DESCRIPTION OF THE DRAWINGS

FIG. 1 is an exploded perspective view of a duplex interconnect assembly for a wall socket including a coupling bushing.

FIG. 2 is a perspective view of an insert of the duplex interconnect assembly from a direction opposite that of FIG. 1.

DESCRIPTION OF A PREFERRED EMBODIMENT

Figure 3:
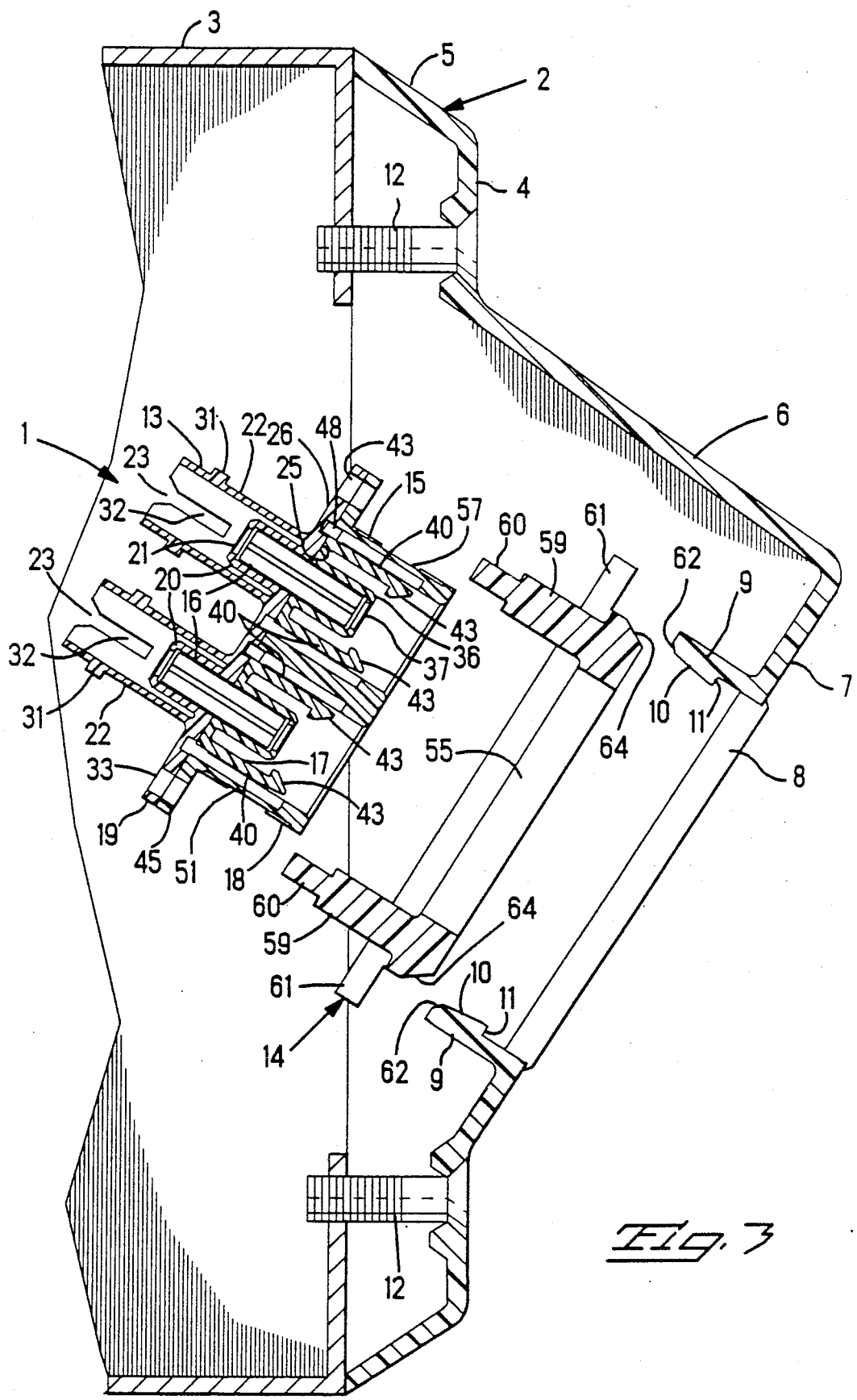
FIG. 3 is a sectional view of wall outlet and duplex interconnect assembly showing the interconnect assembly being intermated to the hood of the outlet.
Figure 4:
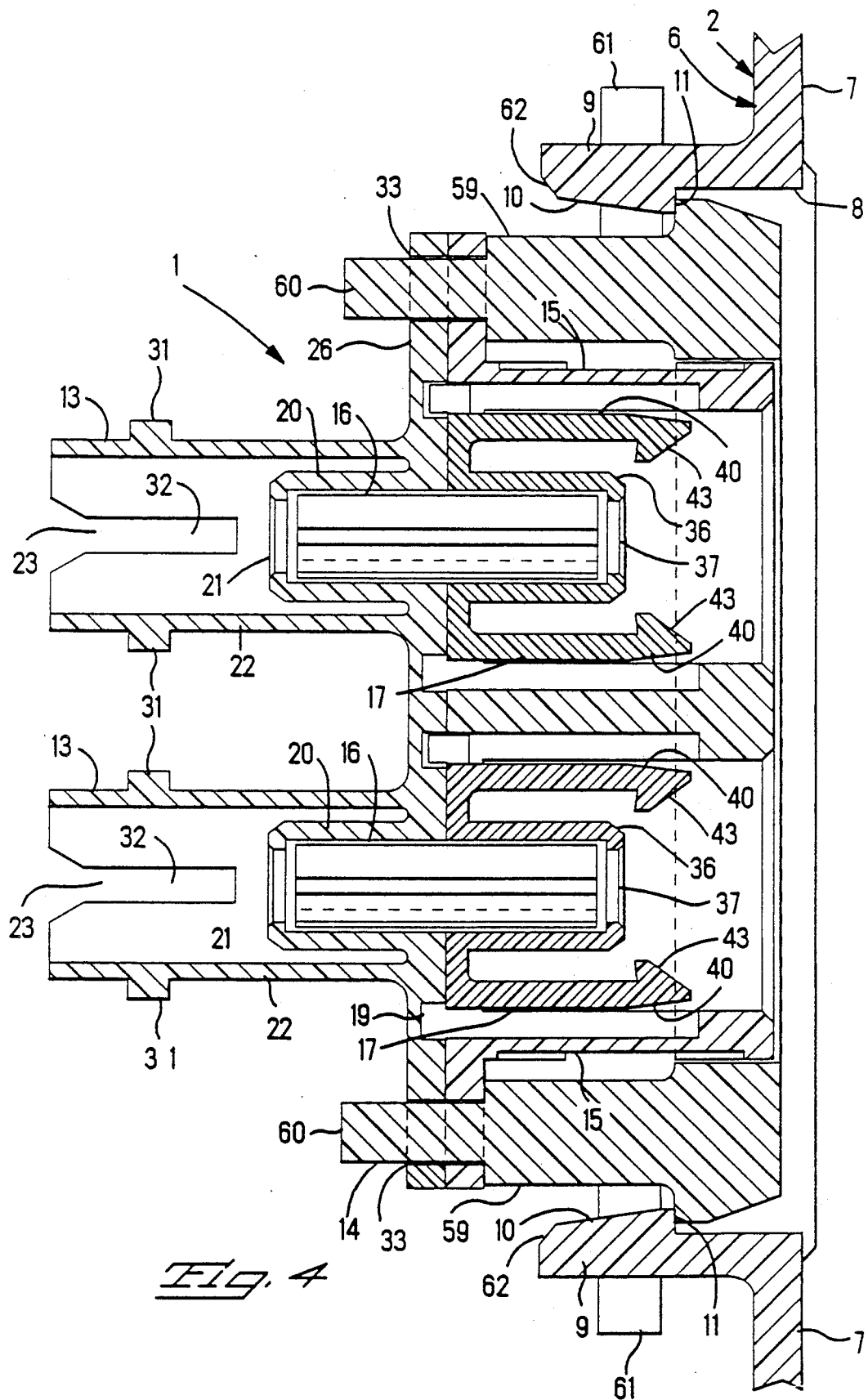
FIG. 4 is a sectional view of wall outlet and interconnect assembly showing the interconnect assembly intermated to the hood of the outlet.

Shown in FIGS. 1 and 2, is a preferred embodiment of the interconnect assembly 1 of the present invention, and in FIGS. 3 and 4 are interconnect assembly 1 and wall outlet 2. FIG. 3 illustrates the mating of the interconnect assembly 1, including insert 14, to the hood 6 of the wall outlet 2, and FIG. 4 shows the interconnect assembly 1 mated to the hood 6 of the outlet 2. Shown in FIGS. 3 and 4, is wall outlet 2 having receptacle box 3 and hood assembly 4. Hood assembly 4 includes base 5 with tent-shaped hood 6 and front plate 7 with aperture 8 for receiving therethrough a plug terminated optical fiber cable, not shown. The plug terminated cable is inserted through the aperture 8 and into mate with the interconnect assembly 1. Further shown are latching beams 9 having paws 10 with lips 11. Hood assembly 4 is secured to receptacle box 3 by means of rivets or other type securing means 12.

The particular preferred interconnect assembly 1 of the present invention is illustrated in FIGS. 1, 2, 3 and 4. Shown is a half structure or interconnect subassembly 13 of a coupling bushing, insert 14 and adapter assembly 15, which includes slotted sleeves 16, receptacles 17, and receptacle housing 18. The particular half structure 13 shown is a duplex coupler for a pair of bayonet type optical fiber connectors, each coupler comprising base 19 having inner socket 20 with axially extending bore 21, which bore 21 forms a continuous passageway through both the body of the socket 20 and base 19. Further, as part of the coupling bushing 13 is a pair of barrel-shaped coupling bodies 22, extending from base 19, and each encompassing, within its interior 23, a socket 20. Coupling body 22 is characterized by barrel-shaped coupling bodies 22 each featuring latching nubs 31 on the outside surface of the barrel of body 22 and keying slots 32 in the rear portion of the barrel of body 22 for the accepting of keying features of a bayonet connector, not shown.

The base 19 of the half structure 13 has forward face 25 and rearward face 26. The said sockets 20 and coupling bodies 22 extend rearward from rearward face 26 of the base 19 while forward face 25 is characterized by two sets of nubs 27 and recesses 28. The nubs 27 and recesses 28 are shaped to complement one another for fit one to the other, for example, as when the base 19 of the herein described coupling bushing 13 intermates with the base 45 of the receptacle housing 18, having nubs 47 and recesses 48 for complementary fit thereto. As shown the nubs 27 are positioned so as to act as aligning and orienting features when intermating with the complementary features of base 45.

Further, the base 19 is characterized by ridges 29 and slots 30 in a sequence around the periphery of a rectangular pattern. The sequence of ridges 29 and slots 30, similarly to the nubs 27 and recesses 28, fits to a complementary sequence of features of the base 45 of the receptacle housing 18. The particular sequence of ridges 29 and slots 30 forming a rectangular pattern provides a feature for oriented intermating with the complementary features of base 45, while the nubs 27 and recesses 28 provide aligning and oriented intermating with base 45. As intermated together, half structure 13 and adapter assembly 15 form a coupling bushing 63 having commonly aligned ports 33 and 54 for receiving a securing means for attachment of the coupling bushing 63 to insert 14 as hereinafter described.

Adapter assembly 15 has a pair of receptacles 17 each including a base 34, substantially rectangular in shape, with rearward extending flanges 35 that are horizontally disposed across approximately one-half of the horizontal perimeter of each base, for fit to within slots 30 of the coupling bushing 13. Each receptacle 17 further includes socket 36 with axial bore 37. When adapter assembly 15 is intermated with coupling bushing 13, socket 36 of each receptacle 17 extending forward, in combination with socket 20 of each coupling bushing 13 extending rearward, forms a continuous supporting structure for intermating, with a bayonet connector, not shown, inserted into the barrel-shaped coupling body 22. Further, axial bore 37 of each socket 36, in combination with bore 21 of each socket 20, forms a continuous passageway for access by a part of the mated bayonet connector, not shown. Each of slotted sleeve 16 fits within both the axial bore 37 of socket 36 and the bore 21 of socket 20 to form a continuous passageway through the bore 38 of the said sleeve 16. Each sleeve 16 has slot 39 to permit expansion of the sleeve as a connector is inserted therein. Each receptacle 17 provides means for connecting the bayonet connector through the coupling bushing 13 to another element such as a connector of the push-pull type, not shown, inserted through the aperture 8 of the hood assembly 4 of the wall outlet 2. The connection is provided by the combination of each socket 36 and resilient catch pieces 40. The resilient catch pieces 40 extend from base 34 and are in the form of cantilever arms extending parallel to and on opposing sides of the longitudinal axis of the socket 36. The cantilever pieces 40 have tab sections 41, protrusions 42 and lip structures 43. In the embodiment shown, a single surface 44 of lip 43 is beveled, however in another embodiment, lip 43 would have side bevels to facilitate lead-in as the receptacle 17 is interconnected, in combination with the coupling bushing 1, to another element such as the plug housing of a push-pull connector, not shown. Receptacle housing 18 has base 45 and forward extending dual compartment-like section 46. Base 45 is complimentary to the base 19 of the coupling bushing 13 in that it is characterized by nubs 47 which fit to recesses 28 of coupling bushing 13, by recesses 48, which fit to nubs 27 of coupling bushing 13, by ridges 49, not shown, which fit complimentarily and provide an orientation with complimentary slots 30 of bushing 13, and slots 50, not shown, which receive ridges 29 of the bushing 13. Forward extending dual structure 46 is characterized by inset planes 51 at the outside top and bottom of the structure 46, and key slots 52 to the side. Within the interior of the compartment structure 46, at top and bottom, are spacings 53 which accommodate the deflections of protrusions 42 during an intermating with a push-pull type of connector. Finally, the receptacle housing 18 has ports 54 for the accepting of pin 60 of insert 14, commonly through both ports 54 and ports 33 of the coupling bushing 63.

The interconnect assembly 1 further includes insert 14 which functions as the securing feature between the assembly 1 and the wall outlet 2 thereby converting the outlet from a FSD connector receptor to the push-pull connector receptor as shown. The insert 14 comprises a platform 55 with a guide port 56 for receiving the forward extending dual compartment structure 46 of the receptacle housing 18 with the receptacle 17 included therein. The platform has extensions 61 which define spacings 57 at opposing ends. The spacings 57 define clearances for snap-in press fit to the latching beams 9 of the hood assembly 4. The insert 14 has a forward extending face 58 having defined dimensions for close fit through the aperture 8 of the outlet hood 6, and further having chamfered leading edges 64 for ease of fit to flanges 9 as hereinafter described. The fit of the extending face 58 provides the positioning of the receptacle housing 18 and receptacle 17 for receiving the plug of the first optical fiber cable. Finally, the insert 14 has rearward extending posts 59, each terminating in a pin 60. The pin 60 terminated posts 59 provide connecting means to the receptacle base 45 and half structure base 19 through the commonly aligned ports 33 and 54 as hereinafter described.

The interconnect assembly is assembled by the first step of inserting each slotted sleeve 16 to within the bore 21 through base 19 to within socket 20 of the half structure 13. Socket 36 of each receptacle 17 is then fitted over and to encompass a portion of the slotted sleeve 16 extending from the bore 21 of the coupling busing 13. The slotted sleeve 16 is accommodated within the continuous axial bore 37 and 21 formed by the fit of each receptacle 17 to the front face 25 of bushing 13. Each receptacle 17 is secured to the base 19 of coupling bushing 13 by the fit of flanges 35 within the complimentary slots 32 of the bushing 13 and within the perimeter defined by extending ridges 29 and slots 30. Thereafter each receptacle 17 is secured to the forward face 25 of the bushing 13 by fitting receptacle housing 18 to the bushing 13 with nubs 47 of the housing 18 fitting to complimentary recesses 28 of the bushing 13 and nubs 27 of the bushing 13 fitting within complimentary recesses 48 of the housing 18. Further, ridges 49 of the housing 18 fit within slots 30 of bushing 13, and ridges 29 of the half structure 13 fit within the slots 50 of the housing 18. This fit of ridges and slots and nubs and recesses provides oriented fit of the housing 18 to the base 19 of bushing 13. The base 34 of the housing 18 is then secured to the base 19 of the bushing 13 by the fit of the complementary recess, nub, slot and ridge features which, after intermating, are subjected to ultrasonics, or gluing by means of an adhesive, to fix the bases 34 and 19, one to the other. The combination of the receptacle housing 18 and receptacle 17 secured to the half structure forms a coupling bushing 63 which is a cooperating mechanism for attachment to a push-pull type of connector.

Both the push-pull connector and the mating of the push-pull connector to assemblies such as referred to in this patent application are disclosed by Mulholland et al, U.S. patent application Ser. No. 491,755 filed Mar. 9, 1990, and this disclosure is incorporated herein by reference.

With reference to FIGS. 3 and 4, the combined receptacle housing 18, receptacle 17, slotted sleeve 16 and coupling bushing 13 is inserted into guide port 56 of insert 14 with each connecting pin 60 of insert 14 aligning and passing into the axially aligned common passageway of port 54 of receptacle housing 18 and port 33 of coupling bushing 13. The connecting pin 60 of the insert 14 may have a split end and may be cold pressed, hot stamped or subjected to ultrasonics to form a permanent connection thereby forming a unitary body of the interconnect assembly 1, including the adapter assembly 15, insert 14, and the coupling bushing 13. The unitary body 1 is then snapped into the aperture 8 in the front plate 7 of hood assembly 4. Contact between the chamfers 64 of forward extending face 58 of insert 14 and the beveled surface 62 of each of paw 10 of each latching beam 9 of the hood assembly 4 forces the resilient latching beams 9 apart to accept the insert 14. Chamfers 64 provide an important function in that they cause an equal deflection of latching beams 9 thereby avoiding disproportionate stressing of one latching beam over the other. Upon the insert 14 clearing the lip 11 of each paw 10, the resilient flanges 9 snap into place to capture the insert 14 and to hold the interconnect assembly 1 positioned at the hood assembly aperture 8 to accept an inserted plug terminated optical fiber cable.

While what has been described constitutes a presently preferred embodiment of the invention, it should be recognized that the interconnector assembly 1 may take numerous other forms. For example, shown in the drawings is an interconnect assembly 1 having a coupling bushing 13 in the form of a duplex coupler for a pair of bayonet type optical fiber connectors. The present invention encompasses coupling bushings 13 of other configurations, both simplex and duplex, for other types of optical fiber connectors such as a threaded type or a push-pull type as taught by Mulholland et al U.S. application Ser. No. 491,755. Further, it should be recognized that the interconnect assembly 1 is applicable to various types of push-pull connectors and to various configurations of the same. For example, the preferred embodiment shows an interconnect assembly 1 for mating to a duplex connector however it is within the scope of the present invention to provide an interconnect assembly 1 for mating to other configurations of connectors such as a simplex configuration.

Also, shown in the drawings, is half structure 13 with coupling bodies 22 both having respective keying features 32 on the same side. Also shown is receptacle housing 18 with two key slots on the same side, and further having the key slots 52 on the same side as keying features 32 of the half structure 13. Within the scope of the invention is half structure 13 with keying features 32 on a side away from the side of the key slots 52 of the receptacle housing 18. Further, in yet another embodiment, the half structure would be characterized by a key feature 32 on both sides, one on the top coupling body 22 on one side, and one on the bottom coupling body 22, on the other; and on reverse sides as well with respect to the key slots 52 of the receptacle housing 18. Correspondingly, the receptacle housing could have key slots 52 on opposite sides of the housing 52, and again, the key slots 52 on opposite sides could be reversed. All of these embodiments are within the scope of the present invention.

Further, within the scope of the present invention are various configurations of wall outlets 2 including, but not limited to those disclosed by Glover et al. U.S. Pat. No. 4,611,887 and by Briggs et al., U.S. pending application Ser. No. 395,680, filed Aug. 18, 1989. Accordingly, it should be understood that the invention is to be limited only insofar as required by the scope of the following claims.

We claim:

1. An interconnect assembly for a wall box, comprising: a duplex coupler having coupler sockets with bores and having bayonet coupling means for connection to bayonet type optical fiber connectors, a receptacle housing surrounding receptacle sockets aligned with the coupler sockets, resilient catch pieces adjacent the receptacle sockets received in the receptacle housing for engagement with a complementary connector, sleeve means partially in the coupler sockets and partially in the receptacle sockets, an insert encircling the receptacle housing and having a guide port, a face plate of the wall box having latching beams and an aperture larger than the guide port, and the insert being adapted for latching engagement with the latching beams and for alignment of the guide port with the aperture, whereby the aperture of the face plate is adapted with the guide port.

2. An interconnect assembly as recited in claim 1, and further comprising: a sequence of ridges and slots around the periphery of the duplex coupler, nubs and recesses around a periphery of the receptacle housing fitted with respective said ridges and slots.

3. An interconnect assembly as recited in claim 1, and further comprising: said catch pieces being cantilevered arms parallel to an don opposing sides of a longitudinal axis of respective said receptacle sockets, said arms having lips and beveled surfaces to facilitate lead in upon connection to the receptacle sockets with a complementary connector.

4. An interconnect assembly as recited in claim 1, and further comprising: connecting pins projecting from the insert and received in ports of the receptacle housing and received in ports of the coupler.

5. An interconnect assembly as recited in claim 1, and further comprising: the receptacle housing having key slots in respective dual compartment sections surrounding respective receptacle sockets.

6. An interconnect assembly as recited in claim 1, and further comprising: coupling bodies on the duplex coupler for connection with respective optical fiber connectors.

7. An interconnect assembly as recited in claim 1, and further comprising: latching beams on the face plate engaging the insert.

8. An interconnect assembly for a wall box comprising: a duplex coupler having coupler sockets, a receptacle housing surrounding receptacle sockets aligned with respective coupler sockets, catch pieces of the receptacle sockets extending into the receptacle housing for engagement with a complementary connector, an insert having pin means for connection with the duplex coupler and the receptacle housing, a guide port in the insert, and a face plate for mounting on the wall box having an aperture aligned with the guide port such that a complementary connector inserted through the aperture and through the guide port engages the catch pieces.

9. An interconnect assembly as recited in claim 8, and further comprising: latching beams on the face plate engaging the insert.

10. An interconnect assembly as recited in claim 8, and further comprising: coupling bodies on the duplex coupler for connection with respective optical fiber connectors.

11. An interconnect assembly as recited in claim 8, and further comprising: a sequence of ridges and slots around the periphery of the duplex coupler, nubs and recesses around a periphery of the receptacle housing fitted with respective said ridges and slots.

12. An interconnect assembly as recited in claim 8, and further comprising: said catch pieces are cantilevered arms parallel to and on opposing sides of a longitudinal axis of respective said receptacle sockets, said arms having lips and beveled surfaces to facilitate lead in upon connection of the receptacle sockets with a further optical connector.

13. An interconnect assembly as recited in claim 8, and further comprising: connecting pins projecting from the insert and received in ports of the receptacle housing and received in ports of the coupler.

14. An interconnect assembly as recited in claim 8, and further comprising: the receptacle housing having key slots in respective dual compartment sections surrounding respective receptacle sockets.

15. An interconnect assembly for a wall box comprising:
- a first interconnect subassembly having a plurality of first sockets, each said first socket being adapted for engagement with a complementary connector;
- a second interconnect subassembly having a like plurality of second sockets, aligned with corresponding sockets of said first subassembly, each said second socket being adapted for engagement with a complementary connector; sleeve means partially in each said first sockets and partially in said second socket aligned therewith;
- an insert surrounding one of said subassemblies and having a guide part;
- a face plate of the wall box having an aperture aligned with the guide port such that a complementary connector inserted through the aperture and through the guide ports is matable with said sockets of said insert surrounding subassembly.

16. The interconnect assembly of claim 15 wherein at least one of said subassemblies is a coupler.

17. The interconnect assembly of claim 15 wherein at least one of said subassemblies said receptacle, said receptacle including a receptacle housing surrounding the sockets of said at least one receptacle subassembly.

* * * * *

UNITED STATES PATENT AND TRADEMARK OFFICE
CERTIFICATE OF CORRECTION

PATENT NO.  : 5,142,597
DATED       : August 25, 1992
INVENTOR(S) : Denis Gregory Mulholland, et al.

It is certified that error appears in the above-identified patent and that said Letters Patent is hereby corrected as shown below:

In the Abstract

Line 4 - replace the word "aperature" with the word -- aperture --.

In the Claims

Claim  3, Column  8, Line  8 - replace the words "an don" with the words -- and on --.

Claim  3, Column  8, Line 11 - replace the word "to" with the word -- of --.

Claim 17, Column 10, Line 11 - replace the word "said" with the words -- is a --.

Signed and Sealed this

Fifth Day of October, 1993

BRUCE LEHMAN

Attest:

Attesting Officer

Commissioner of Patents and Trademarks